United States Patent [19]

Meguro et al.

[11] Patent Number: 5,096,958

[45] Date of Patent: Mar. 17, 1992

[54] HYDROPHILIC SURFACE TREATMENT CHEMICALS, HYDROPHILIC SURFACE TREATMENT BATH, AND HYDROPHILIC SURFACE TREATMENT METHOD

[75] Inventors: Shigeyuki Meguro; Kiyotada Yasuhara, both of Yokohama, Japan

[73] Assignee: Nippon Paint Co., Ltd., Osaka, Japan

[21] Appl. No.: 565,087

[22] Filed: Aug. 10, 1990

[30] Foreign Application Priority Data

Aug. 11, 1989 [JP] Japan ................... 1-208620

[51] Int. Cl.$^5$ ............................. C08L 29/04
[52] U.S. Cl. ................... 524/503; 427/327; 427/435; 524/514; 525/58
[58] Field of Search .............. 252/392; 106/14.15, 106/14.41, 14.42; 524/503, 514; 525/58; 427/327, 435

[56] References Cited

U.S. PATENT DOCUMENTS 3,386,940 6/1968 Tuites .................. 524/503
4,828,616 5/1989 Yamasoe .............. 106/14.13

FOREIGN PATENT DOCUMENTS 55-12375 1/1980 Japan .
56-56572 5/1981 Japan .

OTHER PUBLICATIONS

English abstract of JP-A 60-50397.
English abstract of JP-A 61-250495.
English abstract of JP-A 62-132970.
English abstract of JP-A 62-176578.

*Primary Examiner*—Michael Lusignan
*Attorney, Agent, or Firm*—Sughrue, Mion, Zinn, Macpeak & Seas

[57] ABSTRACT

A hydrophilic surface treatment chemicals comprising, on a solid basis,
(a) 1–10 parts by weight of at least partially saponified polyvinyl acetate having a saponification degree of 45 or more and a polymerization degree of 100–600,
(b) 0.3–15 parts by weight of water-soluble nylon, and
(c) 0.1–5 parts by weight of a water-soluble amino resin,
a weight ratio of the component (b) to the total of the components (a) and (c), (b)/[(a)+(c)], being in the range of 1–¼, and a weight ratio of the component (a) to the component (c), (a)/(c), being in the range of 1/0.05–1/0.5. The hydrophilic surface treatment bath is prepared by properly diluting the chemicals for surface-treating aluminum members.

4 Claims, No Drawings

HYDROPHILIC SURFACE TREATMENT CHEMICALS, HYDROPHILIC SURFACE TREATMENT BATH, AND HYDROPHILIC SURFACE TREATMENT METHOD

BACKGROUND OF THE INVENTION

The present invention relates to aqueous surface treatment chemicals for forming hydrophilic coatings on aluminum members such as heat exchanger fins, etc., a bath containing such surface treatment chemicals, and a method of surface-treating an aluminum member with such an aqueous surface treatment bath. More particularly, it relates to hydrophilic surface treatment chemicals for forming hydrophilic coatings with good corrosion resistance and high hydrophilic nature and also with no or extremely reduced odor on aluminum members such as fins of heat exchangers, a bath containing such a surface treatment chemicals and a method of treating them.

Aluminum and its alloys are light and have good workability and heat conductance, so that they are widely used for fins of heat exchangers. Recently more and more air conditioners have been used not only for cooling but also for warming and dehumidification. In heat exchanger parts of these air conditioners, aluminum alloy fins are generally used.

However, it is observed that moisture tends to be condensed and deposited as water droplets on the fin surfaces of air conditioners during cooling operations. If the fin surface is water-repellent, this condensed water tends to be deposited in a hemispherical form on the fin surface or forms bridges between the fins, preventing smooth air flow, which in turn increases resistance of air flow, thereby decreasing heat exchange efficiency.

In addition, although aluminum and its alloys are essentially excellent in corrosion resistance, it is likely that the condensed water remaining on the aluminum fin surfaces for a long period of time functions like an oxygen concentration cell, and that contaminants and sulfur oxides in the air are absorbed and concentrated in the condensed water. As a result, a hydration reaction and a corrosion reaction are accelerated. Those produced by the corrosion are accumulated on the aluminum fin surfaces, which not only deteriorate heat exchange performance, but also are blown out of the air conditioners as white fine powders together with hot air during the warming operation in the winter season.

To solve these problems, various attempts have been made to form on aluminum fin surfaces coatings for improving their corrosion resistance and for increasing their hydrophilic nature.

For instance, Japanese Patent Laid-Open Nos. 55-12375 and 56-56572 disclose evaporators having fins coated with synthetic resins comprising hydrophilic amides. A water-soluble nylon is chosen as a resin for coating the fins of these evaporators.

Japanese Patent Laid-Open No. 61-250495 discloses an aluminum fin having a chemical primer coating and a coating which comprises organic polymer materials such as water-soluble polyamides showing cationic characteristics in an aqueous solution.

Further, Japanese Patent Laid-Open No. 63-57674 discloses hydrophilic surface treatment chemicals comprising a water-soluble resin such as water-soluble nylon, an alkali metal silicate and an amino alcohol.

Furthermore, Japanese Patent Laid-Open No. 62-132970 discloses surface treatment chemicals for treating fins of a heat exchanger, which comprises (A) an adduct of (a) at least one of urea, thiourea and guanidine and (b) formalin, or a condensate of the adduct, and (B) a water-soluble nylon. Japanese Patent Laid-Open No. 62-176578 discloses a method of surface treatment by using the above chemicals.

However, any one of the coatings disclosed in the above references fails to have good hydrophilic nature and sufficient effect of preventing odor.

An aluminum-made heat exchanger provided with a coating comprising a water-insoluble germicide to kill microorganisms in water droplets condensed on the fins, etc., thereby preventing unacceptable odor caused by the microorganisms is disclosed in Japanese Patent Laid-Open No. 60-50397, but this coating is still insufficient in hydrophilic nature and odor-preventing effect.

As mentioned above, the conventional surface treatment technologies for heat exchangers fail to provide coatings which have not only sufficient hydrophilic nature. corrosion resistance and strength but also excellent odor-preventing effect.

OBJECT AND SUMMARY OF THE INVENTION

An object of the present invention is, therefore, to provide hydrophilic surface treatment chemicals for forming hydrophilic coatings having excellent hydrophilic nature, corrosion resistance and water dissolution resistance with substantially no odor, on heat exchanger fins, etc.

Another object of the present invention is to provide a surface treatment bath containing such surface treatment chemicals.

A further object of the present invention is to provide a method for forming a hydrophilic coating with such properties on an aluminum member.

As a result of intense research in view of the above object, the inventors have found that a combination of at least partially saponified polyvinyl acetate, a water-soluble nylon and a water-soluble amino resin in particular proportions can provide a coating having good hydrophilic nature and corrosion resistance with substantially no odor. The present invention is based on this finding.

Thus, the surface treatment chemicals according to the present invention comprise, on a solid basis,
(a) 1-10 parts by weight of at least partially saponified polyvinyl acetate having a saponification degree of 45 or more and a polymerization degree of 100-600,
(b) 0.3-15 parts by weight of water-soluble nylon, and
(c) 0.1-5 parts by weight of a water-soluble amino resin, a weight ratio of the component (b) to the total of the components (a) and (c), (b)/[(a)+(c)], being in the range of 1-¼, and a weight ratio of the component (a) to the component (c), (a)/(c). being in the range of 1/0.05-1/0.5.

The surface treatment bath according to the present invention comprises, on a solid basis.
(a) 1-10 parts by weight of at least partially saponified polyvinyl acetate having a saponification degree of 45 or more and a polymerization degree of 100-600,
(b) 0.3-15 parts by weight of water-soluble nylon, and
(c) 0.1-5 parts by weight of a water-soluble amino resin, a weight ratio of the component (b) to the total of the components (a) and (c), (b)/[(a)+(c)], being in the range of 1-⅓, and a weight ratio of the component (a) to the component (c), (a)/(c), being in the range of 1/0.05-1/0.5.

The method of surface-treating aluminum or its alloy according to the present invention comprises the steps of degreasing said aluminum or alloy thereof and treating it with a hydrophilic surface treatment bath which comprises, on a solid basis.

(a) 1-10 parts by weight of at least partially saponified polyvinyl acetate having a saponification degree of 45 or more and a polymerization degree of 100-600,
(b) 0.3-15 parts by weight of water-soluble nylon, and
(c) 0.1-5 parts by weight of a water-soluble amino resin, a weight ratio of the component (b) to the total of the components (a) and (c), (b)/[(a)+(c)], being in the range of 1-⅓, and a weight ratio of the component (a) to the component (c), (a)/(c), being in the range of 1/0.05-1/0.5.

DETAILED DESCRIPTION OF THE INVENTION

Hydrophilic Surface Treatment Chemicals (a) At least partially saponified polyvinyl acetate At least partially saponified polyvinyl acetate used in the present invention is expressed by the general formula:

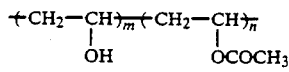

wherein m represents the number of saponified structure units, and n represents the number of unsaponified structure units.

This high-molecular compound is also called polyvinyl alcohol.

The above at least partially saponified polyvinyl acetate should have a degree of saponification of 45 or more, and a degree of polymerization (m+n) of 100-600. The degree of saponification and the degree of polymerization herein are based on JIS K6725 5.2 and JIS K6725 5.4, respectively.

When the degree of polymerization is less than 45 or the degree of polymerization exceeds 600, sufficient hydrophilic nature cannot be obtained. On the other hand, when the degree of saponification is less than 100, a film-forming property and odor-suppressing effects are lowered. The preferred degree of saponification is 80 or more, and the preferred degree of polymerization is 200-550.

The at least partially saponified polyvinyl acetate having a degree of saponification of 45 or more and a degree of polymerization of 100-600 functions to suppress odor and to improve hydrophilic nature. To achieve these functions effectively, the at least partially saponified polyvinyl acetate is used in an amount of 1-10 parts by weight on a solid basis in the surface treatment chemicals. When it is less than 1 part by weight, it fails to give high hydrophilic nature expressed by a contact angle of water. On the other hand, when it exceeds 10 parts by weight, the problems of unacceptable odor and a poor film-forming ability arise. The preferred amount of the at least partially saponified polyvinyl acetate is 2-5 parts by weight.

Incidentally, in addition to the above range, the amount of the at least partially saponified polyvinyl acetate in the surface treatment chemicals should meet the conditions of a particular weight ratio to other components (water-soluble nylon and a water-soluble amino resin) to achieve excellent hydrophilic nature and odor-suppressing effect. The details will be described later.

(b) Water-soluble nylon

The water-soluble nylons used in the present invention are the ones modified to be soluble in water and/or alcohol. Nylons to be modified for use in the present invention may be nylon 6, nylon 66, etc. Among them, nylon 6 is preferable. The average degree of polymerization of the water-soluble nylon is in the range of 50-300, preferably 80-200. Such water-soluble nylons are commercially available, including, for example, AQ-nylon A-90, A-70, A-50, P-70, P-50, etc. (products of Toray Industries. Inc.).

The water-soluble nylon has a function to give good hydrophilic nature to the coating. To achieve this function effectively, the amount of the water-soluble nylon is 0.3-15 parts by weight on a solid basis in the hydrophilic surface treatment chemicals. When the amount of the water-soluble nylon is less than 0.3 parts by weight, the film-forming property becomes poor and the odor-suppressing effects turn insufficient. On the other hand, when it exceeds 15 parts by weight the hydrophilic nature of the resulting coating decreases. The preferred amount of the water-soluble nylon is 1-5 parts by weight.

The water-soluble nylon itself is water soluble and its hydrophilic groups remain intact even after the baking and drying of the coating, so that it does not lose its hydrophilic nature. Such water soluble nylon has at least one of a hydroxy group and an amino group, and secondary amines, tertiary amines, and alkanol amines may be bonded to nylon to impart water-solubility to the nylon. As secondary amines, aliphatic amines such as ethylenediamine, trimethylenediamine, tetramethylenediamine, pentamethylenediamine (cadaverine) hexamethylenediamine, 1,7-diaminoheptane, 1,8-diaminooctane, 1,9-diaminononane, 1,10-diaminodecane, etc., and aromatic amines such as o-phenylenediamine, m-phenylenediamine p-phenylenediamine, etc., may be used. As the tertiary amines, triethyl amine, tripropyl amine, tributyl amine, dimethylbenzyl amine, etc., may be used. As for alkanol amines, ethanol amine, diethanol amine, triethanol amine, amino ethyl ethanol amine, morpholine, etc., may be used.

(c) Water-soluble amino resin

The water-soluble amino resins used in the present invention include melamine resins such as n-butylated melamine resin, iso-butylated melamine resin, benzoguanamine resins, urea resins, etc., which are modified to have water solubility. These resins may usually be prepared by carrying out an addition reaction or an addition condensation reaction of amino resins with aldehydes such as formaldehyde, para-formaldehyde, etc., and then subjecting the resulting compound to etherification with water-soluble monovalent alcohols having 1-4 carbon atoms. Among the water-soluble amino resins mentioned above, the water-soluble melamines are preferable.

The melamine resins used for the preparation of the water-soluble melamines are alkoxymethyl melamines having alkoxy groups such as methoxy, ethoxy, n-butoxy, i-butoxy, etc., and methylated melamine is preferable.

The water-soluble amino resin acts as a cross-linking agent to improve the film-forming property of the chemicals. To achieve this function effectively, the amount of the water-soluble amino resin is 0.1-5 parts by weight on a solid basis in the surface treatment chemicals. When the amount of the water-soluble amino resin is less than 0.1 parts by weight, film-forming property of the surface treatment chemicals becomes poor, and the odor problem arises. When the amount of the water-soluble amino resin is more than 5 parts by weight, the hydrophilic nature of the coating is poor. The preferred amount of the water-soluble amino resin is 0.5-2 parts by weight.

The water-soluble amino resin itself is water soluble, and its hydrophilic groups remain intact after baking and drying of the coating, so that it does not lose its hydrophilic nature, like the water-soluble nylon. Such a water-soluble amino resin has at least one of secondary amines, tertiary amines and alkanol amines, which are listed in (b) above. The water-soluble amino resin may also have hydroxyl groups.

(d) Ratio of (a)-(c)

The surface treatment chemicals of the present invention comprise three components (a), (b) and (c). To provide a hydrophilic coating having excellent hydrophilic nature without odor, the amount of each component in the surface treatment chemicals is required to meet, in addition to the above-mentioned conditions, the following conditions:

(i) A weight ratio of (b) water-soluble nylon to the total amount of (a) at least partially saponified polyvinyl acetate and (c) water-soluble amino resin, (b)/[(a)+(c)], is in the range of 1-¼ on a solid basis; and (ii) A weight ratio of (a) at least partially saponified polyvinyl acetate to (c) water-soluble amino resin, (a)/(c), is in the range of 1/0.05-1/0.5 on a solid basis.

When the ratio of (b)/((a)+(c)) is less than ¼, the hydrophilic nature is insufficient. On the other hand, when it exceeds 1, the odor-suppressing effects and the film-forming ability become poor. The preferred weight ratio of (b)/[(a)+(c)] is ½-1/1.5.

When the weight ratio of (a)/(c) is less than 1/0.5, the film-forming property and the odor-suppressing effects are insufficient even though the hydrophilic nature is sufficient. When it exceeds 1/0.05, the hydrophilic nature becomes insufficient. The preferred weight ratio of (a)/(c) is 1/0.4-1/0.1.

(e) Other additives

The surface treatment chemicals for forming a hydrophilic coating according to the present invention may contain, in addition to the above indispensable components, surfactants, mildew-proofing agents, antiseptics (bactericides), water glass and/or colloidal silica in such amounts as not to generate odor, small amounts of solvents, etc.

The surfactants may be nonionic, cationic, anionic or ampholytic ones, and any suitable surfactants may be selected by taking into consideration the stability, foamability, coatability, etc., of the surface treatment chemical solution.

Typical examples of nonionic surfactants which may be used include polyoxyethylene glycol, polyoxypropylene glycol, polyoxyethylene-polyoxypropylene glycol, polyoxyethylene alkylphenyl ether, glycerin-aliphatic acid esters, sorbitan-aliphatic acid esters, pentaerythritol aliphatic acid esters, polyoxyethylene sorbitan aliphatic acid esters, polyethylene alkyl ethers, etc.

Typical examples of anionic surfactants which may be used include dialkylsulfosuccinates, alkane sulfonates, alkylbenzene sulfonates, alkylnaphthalene sulfonates, polyoxyethylene alkyl sulfophenyl ether salts, alkyl phosphates, polyoxyethylene alkyl ether-phosphates, aliphatic alkyl ester-sulfates, alkyl sulfates, polyoxyethylene alkyl ether-sulfates, aliphatic acid monoglyceride-sulfates, etc.

Typical examples of cationic surfactants which may be used include alkyl amine salts, dialkyl amine salts, etc.

Typical examples of ampholytic surfactants may be N,N,N-trialkyl-N-sulfo alkylene ammonium betaine, etc.

The amount of the surfactants added is preferably 0.5 parts by weight or less. When it exceeds 0.5 parts by weight, the water resistance of the resulting coating decreases.

As for the mildew-proofing agents and the antiseptics (bactericides), quaternary ammonium salts, nitrogen-containing sulfur compounds, halogen-containing nitrosulfur compounds, organic iodine compounds, benzimidazole and its derivatives, etc., may be used.

Typical examples of the mildew-proofing agents include 2-thiazol-4-yl benzimidazole, methylbenzimidazol-2-yl carbamate, N-dichlorofluoromethyl thio-N',N'-dimethyl-N-phenylsulfamide, tetramethyl thiuram disulfide, N-(trichloromethyl thio)-4-cyclohexene-1, 2-dicarboxyimide, 2,4,5,6-tetrachloro-1 3,-isophthalonitrile 2,3,5,6-tetrachloro-4-(methylsulfonyl) pyridine etc. Considering the heat resistance of the resulting hydrophilic coating, 2-thiazol-4-yl benzimidazole, methylbenzimidazol-2-yl carbamate, and 2,4,5,6-tetrachloro-1,3,-isophthalonitrile are preferable.

Typical examples of the bactericides include 1,2-benzo isothiazoline-3-on (BIT), 2.3,5,6-tetrachloro-4-(methylsulfonyl) pyridine, 10,10'-oxybisphenoxarsine, etc.

The preferable amounts of the mildew-proofing agents and the bactericides are 0.1-1.5 parts by weight in total.

The addition of water glass and/or colloidal silica to the surface treatment chemicals in such amounts as not to generate odor may improve the hydrophilic nature. As the water glass, $SiO_2/M_2O$ (where M represents Li, Na and K) may be used, and $SiO_2/K_2O$ is particularly preferable. Colloidal silica having an average particle diameter of 10-50 μm is preferable. Their total amount is preferably less than 1 part by weight.

Further, solvents may be added to the surface treatment chemicals for the improvement of the wettability of the resulting hydrophilic coating. Such solvents include alcohols and cellosolves. Their amounts are preferably less than 7 parts by weight.

Surface treatment bath

The surface treatment bath for forming a hydrophilic coating on an aluminum member according to the present invention is produced by properly diluting the above surface treatment chemicals. The percentages of the components in the bath are as described above. The concentration of the surface treatment bath is usually adjusted so as to provide a hydrophilic coating of 0.5-1.5 g/m² to an aluminum plate by dipping, spraying, brushing, etc. In general, the concentration of solid components in the bath may be 10-200 g/l. If some of the components decrease unproportionally, they should be supplemented in order to maintain the percentage of each component at a proper level.

Surface treatment method

Before forming a coating layer with the surface treatment bath, a degreasing treatment is usually conducted. The degreasing treatment includes an acid-washing treatment using sulfuric acid, nitric acid, etc: solvent degreasing using trichloroethylene, perchloroethylene, gasoline, n-hexane, etc., and alkali degreasing using alkali solutions of sodium hydroxide, sodium carbonate, sodium silicate, sodium phosphate, etc.

After degreasing, a chemical treatment is conducted to form a corrosion-resistant layer on a degreased aluminum member. The corrosion-resistant layer can be obtained by a chromate treatment. The chromate treatment is conducted with a treatment liquid containing chromic acid and sulfuric acid, nitric acid, fluoric acid, phosphoric acid, etc. and proper additives.

The chromate treatment is categorized into two groups; a phosphoric chromate treatment using phosphoric acid as an inorganic acid, and a chromium chromate treatment using the other acids. From the viewpoint of corrosion resistance, the latter is better. The chromate treatment can be conducted by immersion in a treatment liquid, or spraying the treatment liquid. However, to fit exchanger's fins having complicated shapes, an immersion method is easier. The corrosion-resistant layer obtained by the chromate treatment has a Cr content of 50–150 mg/m$^2$. When it is less than 50 mg/m$^2$, the layer does not have sufficient corrosion resistance. On the other hand, when it exceeds 150 mg/m$^2$, its reaction with the hydrophilic layer takes place, resulting in the deterioration of its hydrophilic nature. The aluminum member formed with the corrosion-resistant layer is then washed with water. This is preferably done with flowing water for 10–30 seconds or so.

In addition to the above chromate treatment, a chemical treatment can also be conducted by using a zirconium treating agent. The zirconium treating agent may be a mixture of polyacrylic acid and zirconium fluoride, etc. A layer produced by this zirconium treatment agent has a Zr content of 0.1–40 mg/m$^2$. Like the Cr content, when the Zr content is less than 0.1 mg/m$^2$, sufficient corrosion resistance cannot be obtained, and when it exceeds 40 mg/m$^2$, the hydrophilic nature rather decreases. When the zirconium treatment is conducted after the chromate treatment, larger effects can be obtained.

The surface treatment chemicals of the present invention is diluted properly as a bath, and applied to the aluminum surface subjected to degreasing and the above chemical treatment. This can be done by a roll-coating method, a bar-coating method, an immersion method, a spraying method, a brushing method, etc. In a case where a treated member has a complicated shape like heat exchanger fins, the immersion method is preferable.

Incidentally, the surface treatment bath of the present invention may be applied not only to shaped aluminum members such as fins but also to aluminum plates which are to be shaped after coating.

EXAMPLES 1-7

Aluminum plates are degreased and then subjected to a phosphoric chromate treatment by an immersion method with Alsurf 407/47 (tradename, manufactured by Nippon Paint Co., Ltd.) to form a corrosion-resistant coating having 80–120 mg/m$^2$ of Cr content. These chromate-treated aluminum plates are washed with tap water for 20 seconds.

Each of the aluminum plates is then dipped in a surface treatment solution having the composition shown in Table 1 for 1 minute at a room temperature, and then dried at 180° C. for 20 minutes to form a hydrophilic coating. Each of the resulting hydrophilic coatings is tested with respect to odor, hydrophilic nature, water dissolution resistance, adhesion and mildew-proofing. The test procedures and the evaluation standards of test results are as follows:

(1) Odor test

Each aluminum plate formed with a hydrophilic coating (hereinafter referred to simply as "sample") is subjected to an odor test and evaluated as follows:
Excel.: No odor
Good: Only slight odor
Fair: Medium odor
Poor: Strong odor (2) Test of hydrophilic nature (Test of contact angle of water)

Each sample is tested with respect to initial hydrophilic nature and hydrophilic nature after wetting cycle, by measuring the contact angle of water droplet.

(a) Hydrophilic nature at the initial stage (Initial hydrophilic nature)

5 μl of deionized water is dropped onto a flat surface of each sample held horizontally to measure a contact angle Q of a water droplet by a goniometer. The contact angle Q is classified into the following categories:
Excel.: $Q<20°$
Good: $20°≦Q<30°$
Fair: $30°≦Q<40°$
Poor: $40°≦Q$ (b) Hydrophilic nature after wetting cycle Each sample is subjected to five cycles of wetting treatments, each of which consists of keeping it in contact with tap water at 50° C. for one minute and drying it at 120° C. for 10 minutes. After that, a contact angle Q of a water droplet is measured and classified in the same manner as in the above test (a).

(3) Water dissolution resistance

Each sample is dipped in tap water for 24 hours, and the weight of the coating is measured before and after dipping to determine a water dissolution ratio by the following equation:

Water dissolution ratio (%) = [(initial coating weight − coating weight after 24-hour dipping) ÷ initial coating weight] × 100

The evaluation standards of water dissolution resistance are as follows:
Excel.: less than 10%;
Good: 10% or more and less than 30%;
Fair: 30% or more and less than 50%; and
Poor: 50% or more.

(4) Adhesion Test

Cross-cut test is performed on each sample by the following procedure: Straight cut lines perpendicular to each other are formed on each sample with an interval of 1 mm to have 100 square cut pieces. An adhesive tape is sticked to the cross-cut surface of each sample and then peeled off. The number of the square pieces of the coating which remain on the aluminum member is counted and classified as follows:
Excel 100;
Good: 90–99;

Fair: 80–89;
Poor: 70–79; and
Very poor: less than 70.

(5) Mildew-proofing test

According to JIS Z 2911, each sample of 3 cm×3 cm is immersed in flowing water for 250 hours, and then a suspension containing four kinds of spores shown below is sprayed to the sample. The resulting sample is kept for incubation at 27° C. for 7 days. After the incubation, the propagation of the fungi on the sample is observed and classified into the following categories:

Funqus:
Aspergillus niger IFO 4414
Penicillium funiclosum IFO 6345
Cladosporium cladosporioides IFO 6348
Aureobasidium pullulans IFO 6353

Categories:
Excel.: No propagation of the fungi observed by the naked eye.
Good Slight propagation of the fungi observed by the naked eye.
Fair: The fungi observed by the naked eye covers ⅓ of the surface of the sample.
Poor: The fungi observed by the naked eye covers ⅔ of the surface of the sample.
Very poor: The fungi observed by the naked eye covers substantially the entire surface of the sample.

The results of the tests (1)–(5) are shown in Table 2.

TABLE 1

| | Example No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Polyvinyl Acetate[1] | | | | | | | | | | | | |
| Saponification Degree | 90 | 90 | 90 | 90 | 90 | 90 | 90 | 90 | 90 | 60 | 90 | 90 |
| Polymerization Degree | 500 | 500 | 500 | 500 | 500 | 500 | 500 | 500 | 500 | 200 | 500 | 500 |
| weight % | 3.5 | 3.5 | 3.5 | 9.5 | 1.0 | 5.0 | 1.0 | 3.5 | 10.0 | 3.5 | 3.5 | 3.5 |
| Water-Soluble Nylon[2] (weight %) | 1.7 | 1.7 | 2.6 | 14.0 | 0.6 | 2.2 | 0.4 | 1.7 | 6.0 | 1.7 | 1.7 | 1.7 |
| Water-Soluble Amino Resin | | | | | | | | | | | | |
| Type[3] | M | M | M | M | M | M | M | M | M | M | U | M |
| weight % | 0.8 | 0.8 | 0.8 | 4.5 | 0.5 | 0.5 | 0.1 | 1.3 | 5.0 | 0.8 | 0.8 | 0.8 |
| Mildew-Proofing Agent[4] (weight %) | 0.3 | 0.5 | 0.3 | 0.3 | 0.3 | 0.3 | 0.3 | 0.3 | 0.05 | 0.3 | 0.3 | 0.3 |
| Bactericide[5] (weight %) | 0.1 | 0.5 | 0.1 | 0.1 | 0.1 | 0.1 | 0.1 | 0.1 | 0.05 | 0.1 | 0.1 | 0.1 |
| Additives | | | | | | | | | | | | |
| Type | — | — | — | — | — | — | — | — | — | — | — | Butanol |
| weight % | — | — | — | — | — | — | — | — | — | — | — | 5 |
| Weight Ratio | | | | | | | | | | | | |
| (b)/((a) + (c))[6] | 1/2.53 | 1/2.53 | 1/1.65 | 1/1.00 | 1/2.50 | 1/2.50 | 1/2.75 | 1/2.82 | 1/2.50 | 1/2.53 | 1/2.53 | 1/2.53 |
| (a)/(c)[7] | 1/0.23 | 1/0.23 | 1/0.23 | 1/0.47 | 1/0.50 | 1/0.10 | 1/0.10 | 1/0.37 | 1/0.50 | 1/0.23 | 1/0.23 | 1/0.23 |

| | | Example No. | | | | |
|---|---|---|---|---|---|---|
| | | 13 | 14 | 15 | 16 | 17 |
| | Polyvinyl Acetate[1] | | | | | |
| | Saponification Degree | 90 | 90 | 90 | 90 | 90 |
| | Polymerization Degree | 500 | 500 | 500 | 500 | 500 |
| | weight % | 3.5 | 3.5 | 3.5 | 3.5 | 3.5 |
| | Water-Soluble Nylon[2] (weight %) | 1.7 | 1.7 | 1.7 | 1.7 | 1.7 |
| | Water-Soluble Amino Resin | | | | | |
| | Type[3] | M | M | M | M | M |
| | weight % | 0.8 | 0.8 | 0.8 | 0.8 | 0.8 |
| | Mildew-Proofing Agent[4] (weight %) | 0.3 | 0.3 | 0.3 | 0.3 | 0.3 |
| | Bactericide[5] (weight %) | 0.1 | 0.1 | 0.1 | — | 0.1 |
| | Additives | | | | | |
| | Type | Isopropyl Alcohol | Water Glass | Colloidal Silica[8] | — | Surfactant[9] |
| | weight % | 5 | 0.3 | 0.3 | — | 0.1 |
| | Weight Ratio | | | | | |
| | (b)/((a) + (c))[6] | 1/2.53 | 1/2.53 | 1/2.53 | 1/2.53 | 1/2.53 |
| | (a)/(c)[7] | 1/0.23 | 1/0.23 | 1/0.23 | 1/0.23 | 1/0.23 |

Note
[1]At least partially saponified polyvinyl acetate selected from:
(a) SMR-30HH manufactured by Shin-Etsu Chemical Co., Ltd., having a saponification degree of 90 and a polymerization degree of 500; and
(b) SMR-10M manufactured by Shin-Etsu Chemical Co., Ltd. having a saponification degree of 60 and a polymerization degree of 200.
[2]AQ Nylon P-70 having average degree of polymerization of about 100 (manufactured by Toray Industries, Inc.)
[3]M: Water-soluble methylmelamine (NIKALAC MX-054 manufactured by Sanwa Chemical Co., Ltd.)
U: Water-soluble urea resin (EIBOND UL-3201S manufactured by Gun-Ei Chemical Industries, Ltd.)
[4]COATCIDE 55D manufactured by Takeda Chemical Industries, Ltd.
[5]SLAOFF 72N manufactured by Takeda Chemical Industries, Ltd.
[6]Weight ratio of water-soluble nylon to (at least partially saponified polyvinyl acetate + water-soluble amino resin).
[7]Weight ratio of at least partially saponified polyvinyl acetate to water-soluble amino resin.
[8]SNOWTEX N manufactured by Nissan Chemical Industries, Ltd.
[9]PELEX SSH manufactured by Kao Corporation.

TABLE 2

| Example No. | Odor | Hydrophilic Nature | | Water Dissolution Resistance | Adhesion | Mildew-Proofing Property |
|---|---|---|---|---|---|---|
| | | At Start | After Wetting Cycle | | | |
| 1 | Excel. | Excel. | Good | Excel. | Excel. | Excel. |
| 2 | Excel. | Excel. | Good | Excel. | Excel. | Excel. |
| 3 | Excel. | Excel. | Good | Excel. | Excel. | Excel. |
| 4 | Good | Excel. | Excel. | Good | Good | Good |
| 5 | Excel. | Good | Good | Excel. | Excel. | Excel. |

TABLE 2-continued

| Example No. | Odor | Hydrophilic Nature At Start | Hydrophilic Nature After Wetting Cycle | Water Dissolution Resistance | Adhesion | Mildew-Proofing Property |
|---|---|---|---|---|---|---|
| 6 | Excel. | Excel. | Good | Excel. | Excel. | Excel. |
| 7 | Excel. | Excel. | Good | Excel. | Excel. | Excel. |
| 8 | Excel. | Good | Good | Excel. | Excel. | Excel. |
| 9 | Excel. | Good | Good | Excel. | Excel. | Good |
| 10 | Excel. | Good | Good | Excel. | Excel. | Excel. |
| 11 | Excel. | Excel. | Good | Excel. | Excel. | Excel. |
| 12 | Excel. | Excel. | Good | Excel. | Excel. | Excel. |
| 13 | Excel. | Excel. | Good | Excel. | Excel. | Excel. |
| 14 | Excel. | Excel. | Excel. | Excel. | Excel. | Excel. |
| 15 | Excel. | Excel. | Good | Excel. | Excel. | Excel. |
| 16 | Excel. | Excel. | Good | Excel. | Excel. | Good |
| 17 | Excel. | Excel. | Excel. | Excel. | Excel. | Excel. |

COMPARATIVE EXAMPLES 1-15

Aluminum plates are subjected to a chemical treatment in the same way as in Example 1, and hydrophilic coatings are formed under the same conditions as in Example 1 except for using surface treatment baths shown in Table 3.

The same tests as in Example 1 are carried out on the resulting plates. The results are shown in Table 4.

TABLE 4

| Compara. Example No. | Odor | Hydrophilic Nature At Start | Hydrophilic Nature After Wetting Cycle | Water Dissolution Resistance | Adhesion | Mildew Proofing Property |
|---|---|---|---|---|---|---|
| 1 | Excel. | Excel. | Poor | Poor | Good | Poor |
| 2 | Excel. | Poor | Poor | Excel. | Excel. | Excel. |
| 3 | Excel. | Poor | Poor | Excel. | Excel. | Fair |
| 4 | Poor | Excel. | Poor | Poor | Poor | Poor |
| 5 | Fair | Excel. | Poor | Poor | Fair | Poor |
| 6 | Excel. | Excel. | Poor | Poor | Poor | Poor |
| 7 | Poor | Excel. | Fair | Fair | Good | Fair |
| 8 | Excel. | Fair | Poor | Excel. | Excel. | Excel. |
| 9 | Excel. | Fair | Poor | Excel. | Excel. | Good |
| 10 | Good | Excel. | Fair | Poor | Fair | Poor |
| 11 | Excel. | Good | Fair | Excel. | Excel. | Excel. |
| 12 | Excel. | Poor | Poor | Excel. | Excel. | Good |
| 13 | Good | Excel. | Good | Poor | Fair | Fair |
| 14 | Good | Fair | Fair | Poor | Fair | Good |
| 15 | Good | Excel. | Poor | Poor | Fair | Poor |

As described above in detail, since the surface treatment chemicals according to the present invention comprises at least partially saponified polyvinyl acetate, water-soluble nylon and a water-soluble amino resin in a particular weight ratio, it can provide coatings having excellent hydrophilic nature, water dissolution resistance, adhesion to aluminum members with substantially no odor.

TABLE 3

| | Comparative Example No. | | | | | | | |
|---|---|---|---|---|---|---|---|---|
| | 1 | 2 | 3 | 4 | 5 | 6 | 7 | 8 |
| Polyvinyl Acetate[1] | | | | | | | | |
| Saponification Degree | 90 | 90 | 90 | 90 | 90 | 90 | — | 90 |
| Polymerization Degree | 500 | 500 | 500 | 500 | 500 | 500 | — | 500 |
| weight % | 3.5 | 3.5 | 3.5 | 3.5 | 0.5 | 12.0 | — | 3.5 |
| Water-Soluble Nylon[2] (weight %) | 1.7 | 1.7 | 0.1 | 20 | 1.7 | 1.7 | 1.7 | — |
| Water-Soluble Amino Resin | | | | | | | | |
| Type[3] | M | M | M | M | M | M | M | M |
| weight % | 0.05 | 7 | 0.8 | 0.8 | 0.8 | 0.8 | 0.8 | 0.8 |
| Mildew-Proofing Agent[4] (weight %) | 0.3 | 0.3 | 0.3 | 0.3 | 0.3 | 0.3 | 0.3 | 0.3 |
| Bactericide[5] (weight %) | 0.1 | 0.1 | 0.1 | 0.1 | 0.1 | 0.1 | 0.1 | 0.1 |
| Weight Ratio | | | | | | | | |
| (b)/((a) + (c))[6] | 1/2.09 | 1/6.18 | 1/43 | 1/0.22 | 1/0.76 | 1/7.53 | 1/4.70 | 0/4.3 |
| (a)/(c)[7] | 1/0.01 | 1/2.0 | 1/0.23 | 1/0.23 | 1/1.6 | 1/0.07 | — | 1/0.23 |

| | Comparative Example No. | | | | | | |
|---|---|---|---|---|---|---|---|
| | 9 | 10 | 11 | 12 | 13 | 14 | 15 |
| Polyvinyl Acetate[1] | | | | | | | |
| Saponification Degree | 30 | 90 | 90 | 90 | 90 | 90 | 90 |
| Polymerization Degree | 500 | 50 | 1000 | 500 | 500 | 500 | 500 |
| weight % | 3.5 | 3.5 | 3.5 | 3.5 | 1.0 | 10.0 | 3.5 |
| Water-Soluble Nylon[2] (weight %) | 1.7 | 1.7 | 1.7 | 0.5 | 1.7 | 1.7 | 1.7 |
| Water-Soluble Amino Resin | | | | | | | |
| Type[3] | M | M | M | M | M | M | M |
| weight % | 0.8 | 0.8 | 0.8 | 0.8 | 0.8 | 0.8 | 0.1 |
| Anti-Mold Agent[4] (weight %) | 0.3 | 0.3 | 0.3 | 0.3 | 0.3 | 0.3 | 0.3 |
| Anti-Bacterial Agent[5] (weight %) | 0.1 | 0.1 | 0.1 | 0.1 | 0.1 | 0.1 | 0.1 |
| Weight Ratio | | | | | | | |
| (b)/((a) + (c))[6] | 1/2.53 | 1/2.53 | 1/2.53 | 1/8.6 | 1/1.06 | 1/6.35 | 1/2.12 |
| (a)/(c)[7] | 1/0.23 | 1/0.23 | 1/0.23 | 1/0.23 | 1/0.8 | 1/0.08 | 1/0.03 |

Note
[1] At least partially saponified polyvinyl acetate selected from:
(a) SMR-30HH manufactured by Shin-Etsu Chemical Co., Ltd., having a saponification degree of 90 and a polymerization degree of 500; and
(b) SMR-20L manufactured by Shin-Etsu Chemical Co., Ltd. having a saponification degree of 30 and a polymerization degree of 500.
[2]-[8] Same as [2]-[8], respectively, in Table 1.

Thus, the surface treatment chemicals according to the present invention are highly suitable for the surface treatment of aluminum members such as fins of heat exchangers, etc.

The present invention has been described by Examples, but it should be noted that any modifications are possible unless they deviate from the scope of the present invention defined by the claims attached hereto.

What is claimed is:

1. A hydrophilic surface treatment chemical comprising on a solid basis,
   (a) 2-5 parts by weight of at least partially saponified polyvinyl acetate having a saponification degree of 45 or more and a polymerization degree of 100-600,
   (b) 1-5 parts by weight of water-soluble nylon having at least one group selected from a hydroxy group and an amino group, and
   (c) 0.5-2 parts by weight of a water-soluble amino resin, a weight ratio of component (b) to a total of components (a) and (c), (b)/((a)+(c)) being in the range of 1-¼, and a weight ratio of component (a) to component (c), (a)/(c) being in the range of 1/0.05-1/0.5.

2. The hydrophilic surface treatment chemical according to claim 1, wherein said water-soluble amino resin is a water-soluble melamine resin.

3. An aqueous hydrophilic surface treatment bath comprising, on a solid basis,
   (a) 2-5 parts by weight of at least partially saponified polyvinyl acetate having a saponification degree of 45 or more and a polymerization degree of 100-600,
   (b) 1-5 parts by weight of water-soluble nylon having at least one group selected from a hydroxy group and an amino group, and
   (c) 0.5-2 parts by weight of a water-soluble amino resin, a weight ratio of component (b) to a total of components (a) and (c), (b)/((a)+(c)) being in the range of 1-¼, and a weight ratio of component (a) to component (c), (a)/(c) being in the range of 1/0.05-1/0.5.

4. The aqueous hydrophilic surface treatment bath according to claim 3, wherein said water-soluble amino resin is a water-soluble melamine resin.

* * * * *